Feb. 11, 1958 N. A. PIERSON 2,823,106
PROCESS OF FERMENTING MUNICIPAL REFUSE DISPOSAL
Filed Sept. 1, 1954

INVENTOR.
N. A. Pierson
BY Jerry J. Dunlap
ATTORNEY

United States Patent Office

2,823,106
Patented Feb. 11, 1958

2,823,106

PROCESS OF FERMENTING MUNICIPAL REFUSE DISPOSAL

Norman A. Pierson, Norman, Okla., assignor to Naturizer Co., Norman, Okla., a corporation of Oklahoma Application September 1, 1954, Serial No. 453,669

3 Claims. (Cl. 71—9)

This invention relates to a process of municipal refuse and sewage disposal, and more particularly to a process of composting municipal refuse and sewage.

The term "refuse" is used herein to denote all of the materials collected from homes and business establishments by the usual city garbage or collector trucks. And the term "sewage" is used to denote all of the materials collected by a city's sewage system. As it is well known in the art, the problem of refuse disposal is ordinarily (at least on a municipal scale) considered completely separate from sewage disposal.

At the present time the majority of the cities throughout the United tSates are utilizing either of two refuse disposal methods: land fill or incineration. In the land fill method, a site is selected where large ditches are made by any suitable means, such as bull dozers or the like. The refuse collecting trucks simply dump the refuse into the ditches, and when each ditch is full, the previously removed soil is placed on top of the refuse. This method completely disposes of all the municipal refuse, however, after a period of years, a large land area is used for the filling operations. Furthermore, the ditches of refuse become breeding places and homes for all sorts of rodents and insects.

When using the incineration method, the entire refuse from a city is either placed in a large and expensive incinerator, or piled on the city dump grounds. In either event the refuse is ordinarily collected and deposited at the place of burning for quite some time prior to being set afire. During such periods the refuse must be sprayed with a suitable insecticide, or it becomes a breeding place for flies and the like. When a practicable amount of the refuse has been piled, or deposited in the incinerator, the refuse is lighted and allowed to burn until all of the combustible elements have been burned. The burning operation ordinarily gives off an excessive amount of smoke which forms a smog or the like, and produces a very undesirable odor. The non-combustible portions of refuse are subsequently disposed of by merely being placed on the dump ground, or buried by the land fill operation.

A small percentage of the cities are utilizing a composting process for disposing of their refuse. However, in all these operations the composting is accomplished by a completely aerobic bacterial action. When utilizing only an aerobic activity the composting process is unduly extended, and when the refuse is not enclosed, flies and other insects breed in the refuse over a substantial period of the decomposing process, unless the refuse is turned very frequently. Furthermore, in the commercial composting processes a large percentage of the refuse, such as tin cans, tires, glass, plastic, and rags, is separated from the remaining refuse prior to the composting process. This separation or segregation operation requires the services of several people and greatly increases the cost of composting. Thus, the cost of composting is prohibitive, particularly on a municipal scale. In addition, the present commercial composting plants utilize a process requiring complicated and expensive machinery for their operation.

The usual sewage disposal is accomplished by separating the liquids from the solids and then subjecting the solids to a digesting system to further break them down. Ultimately the liquids are allowed to enter a river or the like, and the solids are ordinarily dried for use as a fertilizer. The dried solids have many detriments as a fertilizer, the most notorious of which is an obnoxious odor when moistened.

The present invention contemplates a novel method of refuse disposal wherein substantially all of the refuse collected by a municipality is composted into an organic humus suitable for use as a soil conditioned. The composting operation contemplates a combination anaerobic-aerobic process which may be conveniently carried out in an open area and with a minimum of machinery and manpower. The usual refuse collecting trucks dump the refuse in windrows; whereupon the pile of refuse is rolled to provide a compacting of the refuse. The compacted pile is then wetted, and preferably innoculated with bacteria, to induce a speedy anaerobic decomposing activity. Subsequently the windrows are turned to loosen the refuse and provide an aerobic bacterial action. After repeated wetting and rolling of the refuse, it is completely decomposed into an organic humus. The compost may then be screened to provide an end product suitable for bagging and commercial use. All of the refuse is composted, except glass, plastic, thick metal articles, rocks and extremely large pieces of wood. Substantially all tin cans and rubber articles, such as tires, are decomposed.

This invention also contemplates a process of simultaneously composting refuse and sewage in one operation. The sewage may be applied to the refuse at the beginning of the anaerobic phase of decomposition and then mixed with the refuse at the beginning of the aerobic phase.

An important object of this invention is to provide a method of composting all of the refuse from a municipality, with a minimum of segregation of the refuse.

Another object of this invention is to provide a method of composting tin cans and rubber which is found in the usual municipal refuse.

Another object of this invention is to substantially eliminate flies and the like in a refuse disposal operation.

A further object of this invention is to compost substantially all of the refuse from a muncipality in a minimum of time, and at a minimum of cost.

Another object of this invention is to produce an organic humus suitable for application to soil without the use of supplementing chemicals.

A still further object of this invention is to provide a novel process of composting by a combination anaerobic-aerobic bacterial activity which produces a rich humus in a minimum of time and with a minimum of manpower.

And another object of this invention is to provide a novel disposal process for both refuse and sewage.

Other objects and advantages of the invention will be evident from the following detailed description, read in conjunction with the accompanying drawings, which illustrate one manner of performing my invention.

Figure 1:
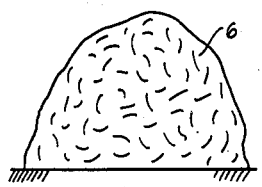
Figure 1 is an end view of a typical pile of refuse prior to being decomposed by the present process.

Referring to the drawings in detail, and particularly

Fig. 1, reference character 6 designates a pile, sometimes hereinafter referred to as a windrow, of refuse containing all of the materials normally collected by a municipal garbage collection system. The windrow 6 is obtained by dumping the contents of a plurality of garbage collection trucks (not shown) into a long pile, or windrow, in any open location accessible to the municipality. After the windrow 6 has been formed, and preferably as soon thereafter as possible, the refuse is sprayed with a lignin digesting bacteria, as will be more fully hereinafter set forth.

Figure 2:
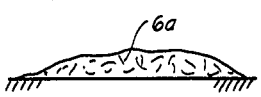
Figure 2 is an end view of a typical pile of refuse as it appears during the initial stages of the present process.

The refuse is then compressed and compacted into the form of pile 6a illustrated in Fig. 2. This compaction may be accomplished in various ways, such as by repeatedly driving a bull dozer over the pile until the pile obtains a substantially compacted or solid surface. The compaction may also be accomplished by repeatedly rolling the pile 6a with a large rolling apparatus of a weight approximating 14,000 lbs. It will be observed from Fig. 2 that the compacted refuse 6a retains an appreciable depth—preferably one to three feet. The width or length of the compacted refuse is immaterial.

At the conclusion of the compacting operation, the pile 6a is wetted to approximately a sixty to eighty percent moisture content. The wetting operation may be carried out in any desired manner, such as by the use of the usual garden or lawn sprinkler apparatuses. The moisture is applied to the top of the pile and filters downwardly into the pile to thoroughly wet the refuse and distribute the bacteria through the refuse. The moistened and compacted pile 6a is then left in the condition shown in Fig. 2 for a twelve to twenty-four hour period. During this period the anaerobic bacteria within the pile becomes very active to increase the temperature of the pile and kill substantially all of the common pathogens and parasites, except those contained in the extreme outer layer of the pile. Also it is believed that various acids, such as hydrochloric, sulphuric and nitric are formed by liberated gases and moisture in the pile. The acids contact tin cans and the like in the refuse and changes the metals into ferrous oxide. The ferrous oxide is then in turn changed into plant minerals by bacterial digestion. It will be understood that the various metals, such as cans and the like, will not be completely decomposed during the anaerobic period. However, the acids are formed during this period to initiate the decomposition described above. The final and complete decomposing of the metals is extended through the latter phases or periods of the present process which will be subsequently described.

Figure 3:
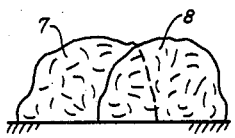
Figure 3 is another end view of a typical pile of refuse during the final stages of the present process.
Figure 4:
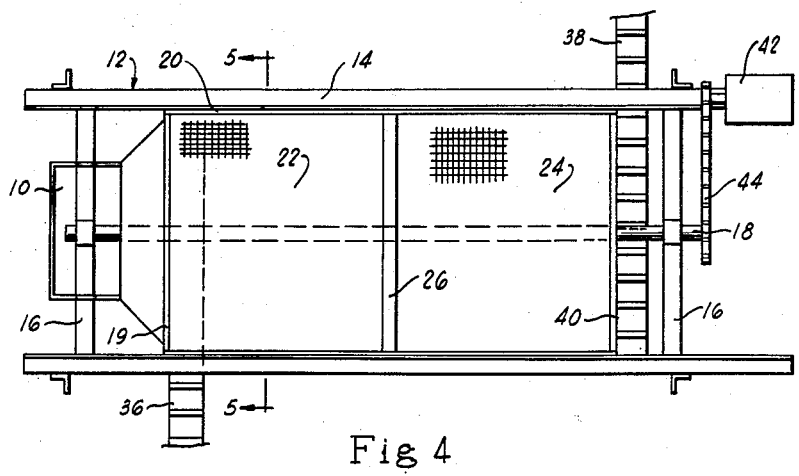
Figure 4 is a plan view of a screening apparatus.

When the anaerobic action has substantially reached its peak of activity, and increased the internal temperature of the pile 6a to approximately 55° C. (which is ordinarily attained within twelve to twenty-four hours) the refuse 6a is turned and stacked to obtain an aerobic bacterial action. The turning may be conveniently accomplished by successively scraping down one side of the pile 6a with a bull dozer and dumping the various loads of the bull dozer in staggered relation as illustrated at 7 and 8 in Fig. 3. This method of turning and stacking the refuse provides a loosening of of the refuse; a complete turning of the refuse (to turn under the previously exposed surface of the pile); and a maximum exposed surface to facilitate aerobic action. The various stacks indicated at 7 and 8 in Fig. 3 are positioned in an offset end-to-end relation to provide a staggered windrow. And the stacks 7 and 8 are approximately six feet high with a width approximately the length of the bull dozer blade. Also, during the turning by the bull dozer, air is trapped within each of the stacks 7 and 8 to form air pockets and facilitate the aerobic decomposition phase.

Immediately after forming the stacks 7 and 8, the refuse will have approximately a forty percent moisture content. The stacks 7 and 8 are retained in this condition until the mold within the stacks reaches its peak, which usually occurs within five or six days. The mold growth can be readily observed about six inches under the surface of the stacks. Also, the stacks are wetted periodically to maintain a moisture content approximating forty percent. Ordinarily, only one or two wettings are required. During this five to six day period, the aerobic bacteria contained within the refuse become active to continue the decomposition process and the growth of mold in the refuse is abundant. Inasmuch as the stacks 7 and 8 are thoroughly exposed to air, substantially all of the bacterial action is aerobic, as contrasted with anaerobic, during this portion of the process. It will also be observed that the pathogens and parasites previously existing in the outer surface of the pile 6a are turned into the central portion of the stacks 7 and 8 and are eliminated by the internal heat of the refuse. Therefore, all of the fly problems and the like are eliminated within twelve to twenty-four hours after the commencement of the present process.

Following the five to six day period described above, the stacks 7 and 8 are turned in any suitable manner to provide a mixing of the refuse and immerse the previously exposed surfaces of the refuse into the center of the new piles or stacks (not shown). The new stacks are preferably shaped in a manner similar to the stacks 7 and 8 shown in Fig. 3 to again expose a large portion of the refuse to air, and to trap air within each stack. Thus, aerobic bacterial action will be continued. After the stacks 7 and 8 have been turned, the moist refuse will be disposed in the upper portion of the new stacks to provide a drainage of liquid and substantially uniform distribution of moisture throughout the refuse. The refuse may be retained in the new piles for a period of nine to twenty-one days for completion of the decomposition process. During this period the stacks are permitted to dry, and the bacterial action completes its cycle to provide a rich organic humus, generally known as compost. The period varies according to climatic conditions, i. e., in extremely cold weather the bacteria action is slower in the outer layers of the stacks, and in hot dry weather, the stacks dry too rapidly and slows down the decomposing process. In any event, the rate of decomposition may be increased by frequently turning the stacks during the last period described above. The decomposition is complete when the material attains a brown earthy appearance and texture, and gives off a pleasing fragrance.

Screening

Figure 5:
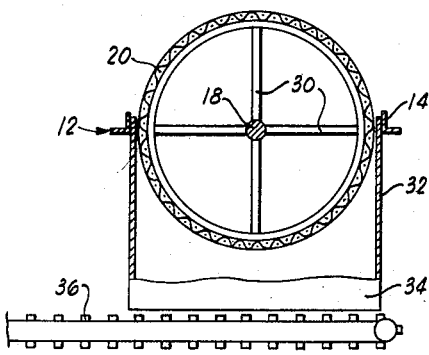
Figure 5 is a sectional view taken along lines 5—5 of Fig. 4.

In order to prepare the finished compost for commercial use, it is fed into the inlet chute 10 of a screening mechanism generally indicated at 12. The screening mechanism 12 comprises a rectangular frame 14 having cross-bars 16 at each end thereof to receive and support the shaft 18 of a cylindrical screen 20. The chute 10 is supported on one bar 16 and extends into the inlet end 19 of the screen 20. The screen 20 is constructed in two sections, 22 and 24, to provide a grading of the finished material. The screen section 22 has a finer or smaller mesh than the screen section 24. A circular band 26 interconnects the sections 22 and 24, and the entire screen 20 is supported at spaced points along its length by spokes or radial arms 30 extending from the shaft 18 as illustrated in Fig. 5. A chute 32, having one tapered wall 34, depends from the frame 14 below the screen section 22 to receive the screened material as will be hereinafter set forth. Also, a suitable conveyor 36 extends laterally from the screening mechanism 12 directly beneath the chute 32 to receive the screened product. Another conveyor mechanism 38 extends underneath the outlet end 40 of the screen 20. A suitable motor 42 is mounted on the frame 14 and is connected to the shaft 18 by a chain drive 44 to provide a rotation of the screen 20.

When the decomposed or composted material is loaded in the inlet chute 10 and the motor 42 is placed in operation to revolve the screen 20, the material will be graded by the screen sections 22 and 24 to provide two types of material. The finer material (substantially all compost)

drops through the screen section 22 and the chute 32 onto the conveyor 36 where it is transported to a suitable storage or bagging mechanism (not shown) for subsequent commercial use. The compost which passes through the screen 22 has the appearance of rich dark brown soil, and is in condition for indefinite storage or immediate bagging. Although this compost contains some foreign material, such as glass, the particles are very small and will not interfere with the application of the material to a soil, or be dangerous to handle with the bare hands.

A portion of the compost fed into the screen 20 will be tightly packed in relatively small quantities, usually in the form of spheres, and will not pass through the screen section 22. This portion of the compost will be passed radially through the screen section 24, and may be considered as the first tailings. Also, a larger portion of foreign non-decomposed material is screened out by the section 24. This mixture of compost and foreign matter can be gathered and applied directly to an open field where the percentage of glass and the like is not important or controlling. Also, this mixture, or first tailings, may be re-cycled in the decomposing process by being introduced at any desired point in the process. A further decomposing and screening will provide a reclamation of a large portion of the compostable matter contained therein.

The larger pieces of foreign matter, which are not or cannot be composted by the present process, are discharged through the end 40 of the screen 20 and carried away by the conveyor system 38. This material ordinarily consists of glass, plastic, the remains of large pieces of wood, and the remains of large pieces of metal. Such discarded material, usually less than three percent, can be disposed of in any suitable manner such as by the land fill method described above. Thus, the separation or segregation of non-compostable refuse can be automatically carried out at the end of the present process, as contrasted with previous separations by hand before the refuse is composted.

*Bacterial inoculation*

As previously stated, the refuse is preferably sprayed with a lignin digesting bacteria prior to being composted. It will be understood that the refuse inherently contains a large amount of both anaerobic and aerobic bacteria. Therefore, the refuse will decompose without the addition of bacteria, if it is compacted, moistened and turned in a manner similar to that set forth above. However, by inoculating the refuse with a lignin digesting bacteria, the temperature rise in the anaerobic phase is materially accelerated to shorten this phase of the process and eliminate the discharge of obnoxious gases from the pile. Ordinarily, when the anaerobic activity is carried on for a period exceeding twenty-four hours, the material emits obnoxious gases. Furthermore, when the contemplated bacteria is added to the refuse, the odor of the refuse throughout the decomposition process, as well as the final humus, is made pleasant to facilitate the composting operation and provide a saleable product.

The desired bacteria has been found to be present in high protein steer manure. The bacteria may be obtained by drying this manure at not over 110° F. for a period of thirty-six hours, or until the moisture content decreases to below twenty percent. The dried remains may then be ground into a product resembling powder, and can be retained in this state indefinitely for further use. Also, the manure may be ground before the drying operation if desired. When preparing the manure for spraying on refuse, one pound of the powder is mixed with five gallons of water and cultured for six to twelve hours. It has been found that this mixture ordinarily has an excess of a two hundred forty billion bacterial count per ounce. The spray is applied to the surface of the pile 6 by use of a low pressure spray, such as an ordinary garden or flower watering spray. Approximately one gallon of the spray is applied for each ton of refuse.

*Sludge*

In the process described above it is contemplated to decompose only the refuse ordinarily collected by a municipality's collector trucks. In some instances however, it may be desirable to dispose of the sludge from a sewage digesting system, as well as the refuse. In the present process this sludge may be applied as a layer on top of the compacted pile 6a. Also, the sludge may be added to the refuse, with or without moisture, during the first six days of the decomposing process. The sludge will be completely decomposed through the combination anaerobic-aerobic action, but when the sludge is added to the refuse, the piles require more frequent turning and aeration to eliminate the objectionable features of prolonged anaerobic activity. The sludge tends to compact, hence the need for frequent turning and aeration.

*Summary*

From the foregoing it will be apparent that the present invention provides a novel process of decomposing substantially all of the refuse from a municipality. The refuse is merely dumped by the collection trucks into a windrow, inoculated with lignin digesting bacteria, compacted, and then moistened to induce a fast temperature rising anaerobic activity. Sewage may be added to the refuse if desired. The anaerobic phase is relatively short and is followed by an extended aerobic phase to completely decompose the refuse and provide a rich organic humus suitable for commercial use. The process disposes of tin cans and rubber found in the ordinary municipal refuse, and the usual fly problem encountered in exposed refuse is substantially eliminated. Furthermore, the entire process can be completed in a minimum of time and at a minimum cost. Also, the resulting humus may be utilized as a soil conditioner without the application of supplementing chemicals.

Changes may be made in the combination and arrangement of steps and operations as heretofore set forth in the specification and shown in the drawings, it being understood that any modification in the precise embodiment of the invention may be made within the scope of the following claims without departing from the spirit of the invention.

I claim:

1. In a process of composting municipal refuse, the steps of driving a bull dozer or the like over a pile of the refuse until the top of the refuse becomes solid, wetting the refuse to a sixty to eighty percent moisture content for inducing and promoting an anaerobic bacterial action in the refuse, continuing the anaerobic action until the temperature of the refuse attains approximately 55° C., and then aerating the refuse for inducing an aerobic bacterial action in the refuse.

2. In a process of composing refuse, the steps of inoculating the refuse with a lignin digesting bacteria, driving a bull dozer or the like over a pile of the refuse until the top of the pile becomes solid, wetting the refuse to a sixty-to-eighty percent moisture content for inducing an anaerobic bacterial action in the refuse, continuing the anaerobic action until the temperature of the refuse approximates 55° C., and then aerating the refuse.

3. In a process of municipal refuse and sewage disposal, the steps of inoculating a pile of the refuse with lignin digesting bacteria, driving a bull dozer or the like over the pile of refuse until the top of the pile becomes solid to exclude air from the pile and induce anaerobic bacterial action in the refuse, applying sewage on the refuse at the beginning of the anaerobic action, continuing the anaerobic action until the refuse attains a temperature of approximately 55° C., then mixing and aerating the refuse and sewage to induce an aerobic bacterial action in the mixture.

(References on following page)

References Cited in the file of this patent

UNITED STATES PATENTS

| | | |
|---|---|---|
| 1,938,647 | Earp-Thomas | Dec. 12, 1933 |
| 1,963,581 | Heukelekian | June 19, 1934 |
| 2,049,889 | Boniface | Aug. 4, 1936 |
| 2,158,918 | Townsend | May 16, 1939 |
| 2,313,434 | Grether | Mar. 9, 1943 |

FOREIGN PATENTS

| | | |
|---|---|---|
| 500,548 | Great Britain | Feb. 10, 1939 |

OTHER REFERENCES

Organic Gardening, "City with Golden Garbage," vol. 20, No. 8, August 1952, pages 12, 13, 39–43, by A. W. Martinez, published by Rodale Press, 6th and Minor Streets, Emmaus, Pa.

U. S. DEPARTMENT OF COMMERCE
PATENT OFFICE

CERTIFICATE OF CORRECTION

Patent No. 2,823,106            February 11, 1958

Norman A. Pierson

It is hereby certified that error appears in the printed specification of the above numbered patent requiring correction and that the said Letters Patent should read as corrected below.

Column 1, line 27, for "United tSates" read -- United States --; column 2, line 14, for "conditioned" read -- conditioner --; column 3, line 59, strike out "of", first occurrence.

Signed and sealed this 15th day of April 1958.

(SEAL)
Attest:
KARL H. AXLINE

Attesting Officer

ROBERT C. WATSON
Commissioner of Patents